May 13, 1969          R. B. MASON          3,444,285

MANUFACTURE OF BLOW MOLDED PLASTIC ARTICLES

Filed Jan. 12, 1966          Sheet 1 of 3

ROBERT B. MASON
INVENTOR

BY
ATTORNEY

ROBERT B. MASON
INVENTOR

United States Patent Office 3,444,285
Patented May 13, 1969

3,444,285
MANUFACTURE OF BLOW MOLDED
PLASTIC ARTICLES
Robert B. Mason, Mystic, Conn., assignor to Monsanto
Company, St. Louis, Mo., a corporation of Delaware
Filed Jan. 12, 1966, Ser. No. 520,160
Int. Cl. B29c 17/04
U.S. Cl. 264—98     5 Claims

ABSTRACT OF THE DISCLOSURE

Flash and article forming portions of a plastic parison are simultaneously expanded in a blow molding operation against cooled walls of the mold.

---

This invention relates generally to a method of forming plastic articles, and more particularly to a method of eliminating the undesirable effects of waste flash material formed concurrent with the article.

In the manufacture of hollow plastic articles, it is conventional to extrude heated thermoplastic in the form of tubing and position it between open halves of a partible mold. The halves are closed around the tubing, and it is then expanded to produce an article conforming to the shape of the mold cavity. The mold cavity surfaces defining the article configuration are cooled to permit setting of the plastic on contact therewith. When the article has an offset neck substantially narrower than the body, a portion of the tubing length adjacent to the neck will generally be compressed into a thick section of flash material when the mold halves conforming to this configuration are closed about the tubing. Flash is defined herein as waste material formed withi nthe mold along with the article, which is trimmed from the finished article subsequent to the blowing step. This thick section of waste flash is incompletely cooled when ejected from the mold, and thereafter shrinks and twists on cooling to the temperature of the blown article and distorts the hollow neck by pulling it in the direction of the flash. The result is an unsightly article with frequent stress cracking in the neck area. Cutting equipment for trimming the flash material from the finished article subsequent to the blowing step must be preset to allow for this neck distortion.

When ejection is onto a conveyor, for example, hot flash attached to one article frequently sticks to a cooler portion of an adjacent unit, and both articles most likely must then be rejected. It is usually necessary to insure separation of the articles until the thick section of flash has cooled.

On grinding this flash material during a recovery step after it has been trimmed from the article, as for example in a whirling blade type of grinder, the thick pieces of flash material frequently plug the grinder, hold down the equipment, and thereby increase manufacturing costs.

Attempts have been made to control the temperature of this flash material. The mold halves may be relieved in the area where the flash is formed to provide sufficient open cross sectional area to permit the compressed tubing to contact cooled sides of the mold walls. The mold sections have also been corrugated in this area to provide more surface for such contact. The wall thickness of the tubing will vary, however, when operating conditions are varied slightly, for example when a different thermoplastic material is extruded. The open area of a given mold relief cavity, therefore, may be too narrow in which case the mold halves will not seal tightly. After blowing this results in a thick ridge of waste material along the contour of the article which is costly and difficult to remove. Inconsistent cooling will result for a thin wall tube since the outside surface of the compressed portion of the tube will not completely and uniformly contact the cavity walls. The extent to which the flash twists and distorts the neck after ejection from the mold will vary with this non-uniform cooling, and trimming blades which may have been accurately preset for a slightly different condition may damage the article in the subsequent trimming step so that it must then be rejected as scrap. It has therefore been difficult to consistently provide the correct cavity relief for compression cooling the flash material sufficient to prevent neck cocking and processing problems, while at the same time insuring that the mold halves seal properly.

Accordingly, it is the principal object of this invention to provide a method and apparatus for obviating the processing and handling difficulties associated with hot flash material in manufacturing hollow plastic articles as heretofore discussed.

It is a particular object of this invention to provide an improved method and apparatus for forming hollow plastic articles having offset neck portions narrower than the body of the article.

A further object of this invention is to provide an apparatus for forming hollow plastic articles having offset neck portions in which the dimensions of the mold pinch relief area are not critical.

A further object of this invention is to provide an improved method and apparatus for cooling flash material formed with an article while both are retained within a closed mold.

A further object of this invention is to provide a method and apparatus for forming hollow plastic articles having narrow necks by means of which the quantity of scrap generated in trimming the finished article is reduced.

A further object of this invention is to provide a method and apparatus for forming hollow plastic articles having narrow necks by means of which the thickness of flash material formed concurrent with the article is reduced.

A further object of this invention is to provide a method and apparatus for forming hollow plastic articles having offset narrow necks by means of which the recovery step of grinding flash material trimmed from the article is simplified.

Another object of this invention is to provide a method and apparatus by means of which the manufacturing cost to hollow plastic articles formed by inflation molding is reduced.

Other objects of this invention will in part be obvious and will in part appear hereinafter.

These and other objects are accomplished by providing a method and apparatus for forming plastic articles comprising the steps of enclosing a generally tubular length of plastic material within a partible mold such that an internal section of a wall of the mold partially collapses a portion of the tubular length into flash material within the mold, and expanding the tubular length and flash material.

For a fuller understanding of the nature and objects of this invention, reference should be had to the following detailed description taken in connection with the accompanying drawings, in which.

Figure 1:
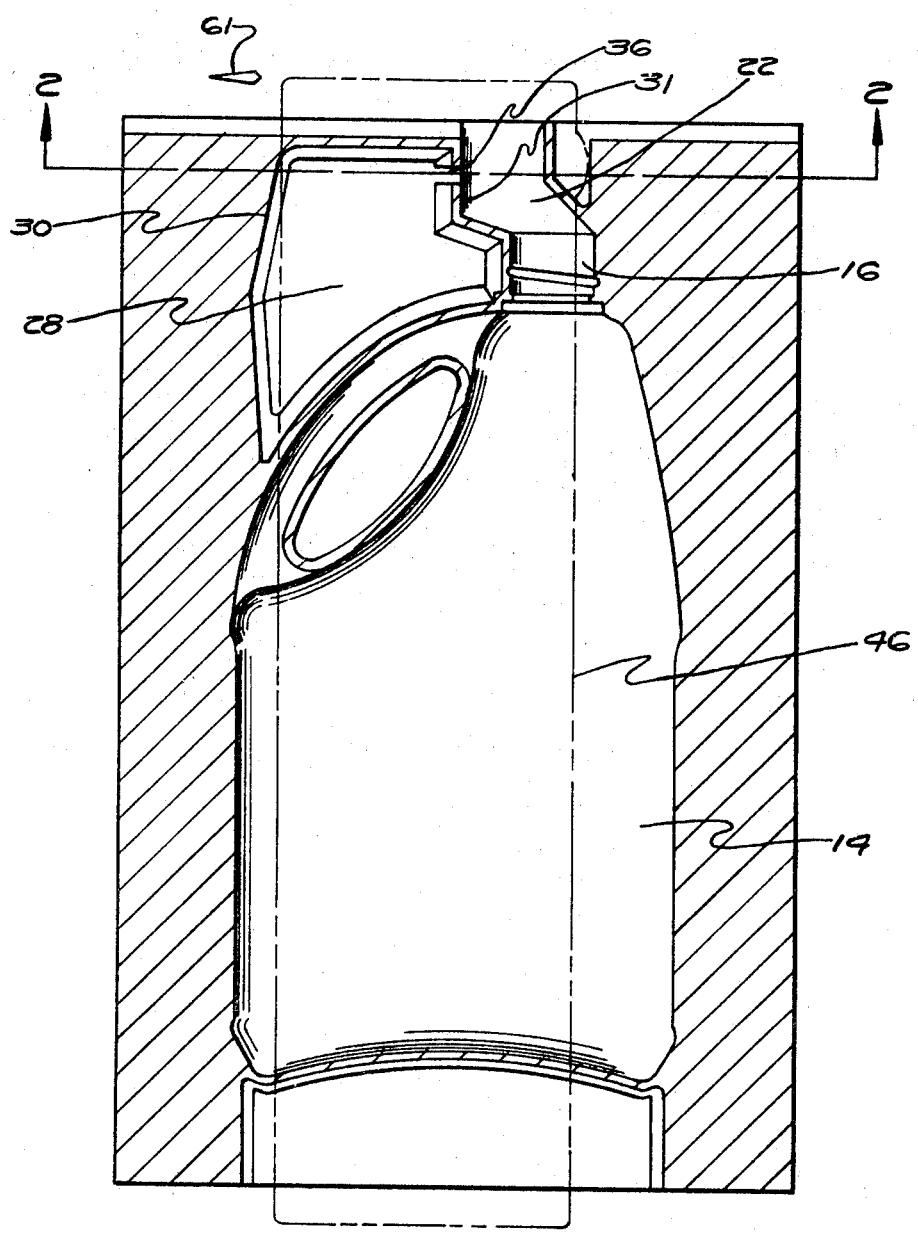
FIG. 1 is a cutaway sectional view of a closed mold illustrating the pinch relief cavity.
Figure 2:
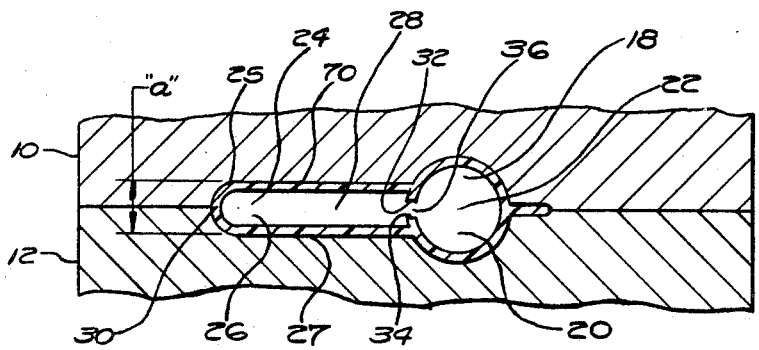
FIG. 2 is a partial top sectional view of a closed mold sectioned at about the line 2—2 of FIGURE 1 illustrating the expanded flash of the collapsed tube.

With reference to the drawings wherein identical numerals refer to identical parts there are shown mold components comprising two mold halves. The mold halves may be mounted upon conventional supporting and operating mechanisms for lateral movement between the separated mold half position not shown and the closed mold half position shown in the drawings. Referring to FIGS. 1 and 2 there are shown two mold halves 10 and 12 with each mold half having an interior cavity portion such that when the mold halves are closed a cavity 14 is defined having a peripheral configuration of the body portion of an article to be molded. Cavity 14 may include a generally cylindrical neck defining portion 16, laterally offset from the axial center line, which is formed by cooperating semicylindrical portions of the mold halves 10 and 12. Situated above and laterally offset from the neck defining portions of the mold walls, mold half 10 may include a semi-cylindrical recessed top portion 18 while mold half 12 may include a mating semicylindrical top portion 20 which forms cylindrical passageway 22 when the mold halves are in closed position. Communicating with and located laterally beside recessed end portion 18 and 20 and axially above the body defining portions of the mold walls is hollow depression 24 of mold half 10 and cooperating hollow depression 26 of mold half 12. When the mold is in closed position, together they form pinch relief cavity 28. The opposing walls of hollow depressions 26 and 28 of mold half 10 and of mold half 12 which define pinch relief cavity 28 abut together along outer edge 30 when the mold is in a closed position, but are radially indented at 32 and 34 along the inner edge 31 of the pinch relief cavity 28 adjacent to top recesses 18 and 20 to form orifice 36 which provides an opening between pinch relief cavity 28 and cylindrical passageway 22.

Figure 4:
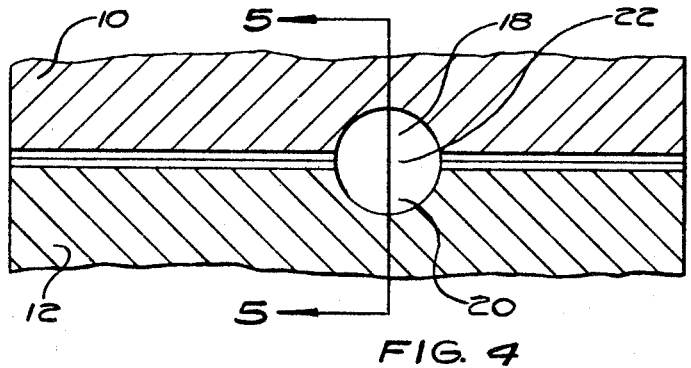
FIG. 4 is a partial plan view of the closed mold illustrating the top pinch line.
Figure 5:
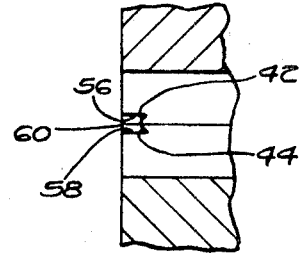
FIG. 5 is a partial vertical section along the line 5—5 of FIG. 4.
Figure 6:
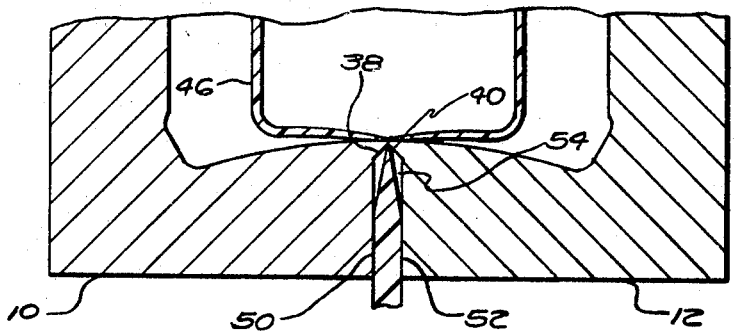
FIG. 6 is a partial vertical section of the closed mold illustrating the bottom pinch line.

As schematically illustrated in FIG. 6, cooperating shoulders 38 and 40 on mold halves 10 and 12 are provided for sealing the tubular length across the bottom width of the mold. As shown in FIGS. 4 and 5 similar cooperating shoulders 42 and 44 are provided for tube sealing at the top of the mold, however, the shoulders are interrupted by semicylindrical recessed top portions 18 and 20.

In operation, an extruded length of thermoplastic material intermittently supplied from a conventional extruder is initially positioned between open mold halves 10 and 12. The mold halves are then closed about the extruded tubing, the dotted outline of which is typically shown as 46 in FIG. 1 after closing of the mold. As shown in FIG. 6, the bottom end of the tube is pinch sealed shut by means of typical cooperating shoulders 38 and 40. Recess 48 is formed by an inward indent of mold halves 10 and 12 below shoulders 38 and 40. Compression surface 50 below shoulder 38 on mold half 10 and surface 52 below shoulder 40 on mold half 12 form bottom recess 54 and contact the tubular length extending below cavity 14 so as to compress it into bottom recess 54. Similar pinch sealing occurs at the top end of the tube by means of typical cooperating shoulders 42 and 44. Compression of the tube at the top by contact with surfaces 56 and 58 of top recess 60 is similar to that occurring at the bottom of the tube except that a portion of the top of the tube is retained open which corresponds to cylindrical passageway 22 in mold halves 10 and 12.

A portion of the length of tube is partially collapsed in pinch relief cavity 28 by the action of the closing mold halves. The depth of pinch relief cavity 28 as defined by dimension $a$ in FIG. 2 is designed so that on movement of the mold halves into the closed position, the length of tube enclosed within the pinch relief cavity is collapsed partially inwardly, but not to the extent that any of the inside surface of one half of the enclosed tube contacts that of the other half. After the mold halves are closed, the end of the extruded tube is cut from the length enclosed within the mold halves by conventional knife means shown typically as 61 in FIG. 1.

Figure 3:
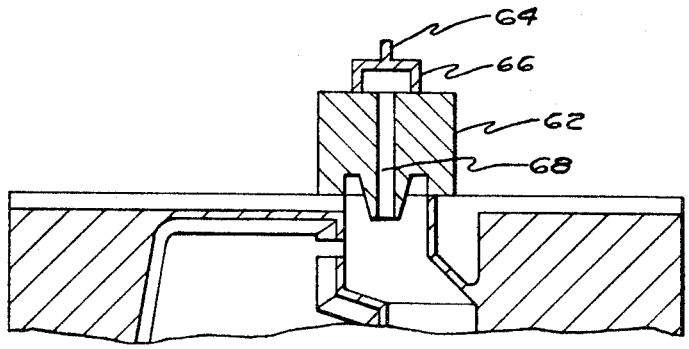
FIG. 3 is a cutaway sectional view illustrating the inflation assembly.

A blow assembly is shown in FIG. 3 which includes blow head 62 which may be operated by piston rod 64 which may be connected to the blow head by a schematically illustrated mounting bracket 66. Piston rod 64 would extend from a pressurized fluid operated piston. When the blow head has been positioned over passageway 22, pressurized fluid is introduced through channel 68 in blow head 62 into cavity 14 to radially inflate the tube against the article defining portions of the mold walls.

Simultaneously with the expansion of the tube into contact with the article defining walls of the mold halves, a portion of the pressurized fluid being introduced into passageway 22 enters pinch relief cavity 28 through orifice 34 to expand the flash material confined within the pinch relief cavity into positive contact with pinch relief surface 25 of hollow depression 24 and mating pinch relief surface 27 of hollow depression 26. The outside surface of this flash material is thereby cooled by positive contact with pinch relief surfaces 25 and 27, and the inside surface cooled by the pressurizing fluid. The partially collapsed tubing after expansion into conformity with surfaces 25 and 27 of pinch relief cavity 28 is shown as 70 in FIG. 2.

Figure 7:
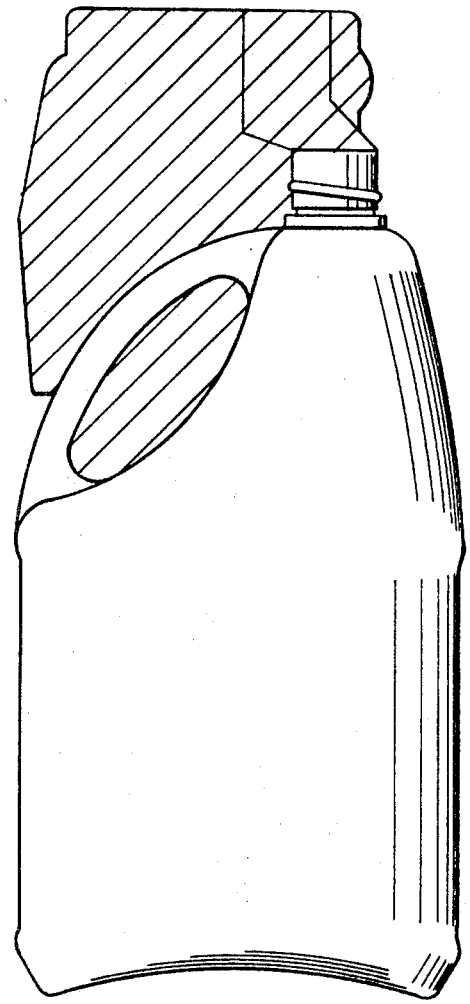
FIG. 7 is a front view of a blown article after ejection from the mold.

After the tube has been thus expanded into conformity with the mold walls and cooled, the pressurized fluid is vented to atmosphere from pinch relief cavity 28 through orifice 36 and then passageway 22, and from cavity 14 also through passageway 22. The mold halves may be then separated and the formed article removed. The apparatus components may then return to their original positions for subsequent molding operations. As shown in FIG. 7 the blown flash adjacent to the neck of the article in pinch relief cavity 28, in central passageway 22, as well as any other flash formed by compression contact with opposing projections of the mold walls is trimmed from the finished article by conventional means subsequent to the article forming step. Conventional grinding means are then employed in a recovery step thereafter to reduce the size of this flash material prior to reuse. This flash material is typically shown as the cross hatched portion of FIG. 7.

The above description, and particularly the drawings, are set forth for purposes of illustration only and are in no way to be taken in a limited sense.

As previously stated this invention is directed toward a method and apparatus for forming plastic articles comprising the steps of enclosing a generally tubular length of plastic material within a partible mold such that an interior section of a wall of the mold partially collapses a portion of the tubular length into flash material within the mold and expanding the tube and this flash material.

It is essential with the method and apparatus of the present invention that the waste flash material be blown from the generally tubular extrudate confined within the closed mold and that it eventually be trimmed from and not constitute a part of the finished article. The passageway for entry of the fluid for expanding the flash is preferably through a portion of the mold which does not define the finished article configuration.

In forming an article from the tubular length within the mold with the method and apparatus of the present invention, some flash material other than that formed by partial collapsing may be formed by complete collapsing or compressing into surface contact between opposing projections on the interior walls of the mold halves, as for example that portion of the tube situated between the handle and the body of the illustrated embodiment, or the eye of the handle as it is commonly known. The flash which is the subject of the present invention is waste material not a part of the finished article which is formed on partial collapse of the tube within the mold as opposed to complete collapse or compression.

An advantage of the present invention is that the criticality of the dimensions of the pinch relief cavity to insure surface contact of the partially collapsed tube with the mold walls while still permitting the mold to close is eliminated. With the blown flash technique of the present invention the open cross sectional area of the pinch relief cavity may be increased without concern about complete surface contact with the cavity walls. It is essential, however, that the cross sectional area be sufficient to insure that compression of the tube to the extent of surface contact of the interior walls of the tube does not occur. The cooperating walls of the pinch mold relief cavity may be indented slightly inward adjacent to the article neck so that on closing the mold these mating indents act as dams to crowd or force a slight additional amount of plastic into the neck area to insure against formation of pin holes in the article neck on blowing the flash. The radial and axial dimensions of the mold relief cavity, of course, should be such as to enclose a maximum amount of flash material.

Another advantage of the present invention is that by expanding the flash material its wall thickness is reduced. Grinder operations during scrap recovery of the flash are therefore simplified since plugging is minimized when the scrap is fed as thin walled, hollow pieces as opposed to thick, solid pieces formed when compression cooling is employed.

When the flash is expanded and uniformly cooled prior to ejection from the mold according to the present invention, shrinking and twisting of the flash and distortion of the hollow neck is eliminated. The subsequent step of trimming the expanded flash from the finished article is simplified since variations in the shape of the flash and amount of distortion of the neck are therefore eliminated. Scrap is eliminated which might have been formed when an article having attached compression cooled flash material was damaged because of an incorrect setting of the blades of the trimming equipment.

The temperature of the mold surfaces are preferably maintained as low as possible without atmospheric condensation by coring or providing channels in the metal of the mold halves adjacent to the cavities through which a coolant, for example water, is circulated at temperatures between about 40 to 100 and preferably between 50 and 85 degrees Fahrenheit at the inlet to the mold halves. Though it is preferable to have the surfaces of the pinch relief cavity cooled by this method it may not be necessary especially for a small cavity.

The pressurized fluid for expanding the flash material may enter the pinch relief cavity in a variety of ways. For example, instead of mounting the blow pipe over a cylindrical passageway offset above the article neck, the top face of the tube may be completely pinch sealed shut and entry made by penetrating the side of the passageway with a needle blow pipe, with the pressurizing fluid still entering through an opening between the cavity and the passageway. The pressurizing fluid may enter through the bottom of the mold instead of through the top. The pinch relief cavity may be connected to a separate source of pressurizing fluid, in which case blowing of the flash material may be done at any time after the mold is closed, that is prior to, subsequent to, or concurrent with blowing the article.

The required minimum diameter of the orifice opening into the pinch relief cavity will vary with the thickness of the extruded parison. It must be sufficient to permit entry and exhaust of the pressurizing fluid without plugging of the orifice with plastic. A minimum diameter of about ¼ inch is preferred for a finished article having a weight of 5 to 10 grams per inch of article height. Smaller diameters are suitable for lighter weight articles. The orifice may be as large as ¾ inch if space is available within the mold halves without interferring with the other mold components.

Fluid pressure for inflation should preferably be at least 35 pounds per square inch to insure accurate formation of the details of the article surface. The upper pressure is not as critical, but it is generally best that it does not exceed about 100 pounds per square inch. At pressures above this level special clamping provisions are usually necessary to insure proper sealing of the partible mold.

The pinch relief cavity is preferably provided by cooperating hollow depressions in both mold halves. It may, however, be included completely within one rather than both of the mold halves. Mold machining costs may be less with this approach when compared with a pinch relief cavity obtained by machining hollow depressions in both mold halves.

With the apparatus and technique of this invention, selective portions of flash material formed within a mold in a conventional blow molding operation because of the finished article configuration may be effectively cooled by blow molding simultaneously with the article. The method is particularly adaptable to large portions of flash material when the effects of shrinking on cooling, and sticking to adjacent articles are pronounced, but it may be utilized in cooling troublesome smaller amounts of flash material in critical areas. For example, the short section of tubular pinch directly axially above the neck of the illustrated article could have been blown if desired. The invention is not limited to use in forming articles with offset necks, but it like wise applicable to articles having narrow concentric necks on wide article bodies.

Any plastic material capable of being blown may be utilized in the present invention. Typical materials are thermoplastics such as lower or intermediate density polyethylene, polyvinyl chloride or polystyrene. High density polyethylene is preferred.

What is claimed is:

1. In the method of blow molding a hollow article having a reduced diameter neck and an integral hollow handle by expansion of a heated plastic parison in a blow mold having cavity sections conforming to the shape of the article, wherein flash is formed from a portion of said parison within the article forming mold laterally adjacent the article neck concurrent with formation of the article, the improvement comprising the steps of expanding said flash forming portion of the parison simultaneously with expansion of the article forming portion of the parison to form the article with the flash integrally attached thereto, removing heat from the article and attached flash at substantially the same rate to cool the article and the attached flash in substantially the same time period and removing the attached cooled flash from the article.

2. A molding apparatus comprising:
  (a) partible mold sections having internal recesses with cooled surfaces which cooperate when the mold is closed to define a body cavity conforming to the shape of the periphery of the body of a container and a neck cavity conforming to the shape of the neck of said container;
  (b) said closed mold having a passageway communicating at one end with said neck shaped cavity, and opening at its other end to the exterior of said closed mold;
  (c) wall portions of said closed mold having cooled surfaces defining a scrap cavity laterally adjoining said passageway and said neck shaped cavity, the depth of said scrap cavity in a direction perpendicular to the parting line of said partible mold sections being defined by $a$ wherein $a$ has a value which is greater than the total wall thickness of a heated moldable parison, said thickness being defined as the thickness obtained by compressing the parison such that the inside surface of one wall portion contacts that of an opposing wall portion, at least a portion of the peripheral walls of said scrap cavity having a section which forms a common side with said passageway and said neck shaped cavity, said common side section being interrupted in the portion thereof which is common to said passageway to define an opening between said passageway and said scrap cavity for passage of pressurized fluid therethrough; and (d) injection means for introducing said pressurized fluid into said closed mold through the end of said passageway which opens to the exterior of the closed mold, to simultaneously expand portions of said heated, moldable parison within said closed mold against the cooled surfaces of said communicating scrap, neck and body cavities.

3. An apparatus for blow molding a container having a body, a reduced diameter neck and a hollow handle communicable with the container body comprising:

(a) partible mold sections having internal recesses which cooperate when the mold is closed to define a first cavity having portions conforming to the shape of the container body and neck and a second cavity conforming to the shape of the handle, said second cavity communicating at either end with said first cavity;

(b) an upwardly extending passage in the top portion of said closed mold having an open upper end and a lower end opening into the neck shaped portion of said first cavity;

(c) wall segments of said partible mold sections defining a scrap cavity on the mold parting line when said mold is closed, a first portion of said scrap cavity being laterally adjacent said passage and a second portion being laterally adjacent the neck shaped portion of said first cavity and above said second cavity, the depth of said scrap cavity in a direction perpendicular to the parting line of said partible mold sections being defined by $a$ wherein $a$ has a value which is greater than the total wall thickness of an expandable plastic parison, said thickness being defined as the thickness obtained by compressing the parison such that the inside surface of one wall portion contacts that of an opposing wall portion;

(d) a pinch land on each mold section on the parting line extending around the portion of the periphery of said scrap cavity which is adjacent said passage and the neck shaped portion of said first cavity, at least one of said lands having an indented portion extending away from the parting line defining an opening between said passage and said scrap cavity when the mold is closed for passage of pressurized fluid therethrough;

(e) means for cooling the surfaces of said scrap, first and second cavities; and (f) means for introducing said pressurized fluid into said closed mold through the open end of said passage to simultaneously blow mold portions of said expandable plastic parison enclosed within said mold against the surface cooled walls of said communicating scrap and first container shaped cavities and said first container shaped and second handle shaped cavities.

4. An apparatus for forming a hollow container having a body and a reduced diameter neck offset from the body axis comprising:

(a) partible mold sections having internal recesses which cooperate when the mold is closed to define a container shaped cavity having portions conforming to the shape of the container body and neck;

(b) an upwardly extending passage in a top portion of said closed mold having an open upper end and a lower end opening into the neck shaped portion of the container cavity;

(c) wall segments of said partible mold sections defining a scrap cavity on the mold parting line when said mold is closed, the depth of said scrap cavity in a direction perpendicular to the parting line of said partible mold sections being defined by $a$ wherein $a$ has a value which is greater than the total wall thickness of an expandable plastic parison, said thickness being defined as the thickness obtained by compressing the parison such that the inside surface of one wall portion contacts that of an opposing wall portion, a first portion of said scrap cavity being laterally adjacent said passage and a second portion being laterally adjacent the neck shaped portion of the container shaped cavity;

(d) a pinch land on each mold section on the parting line extending around the portion of the periphery of said scrap cavity which is adjacent said passage and the neck shaped portion of the container shaped cavity, at least one of said lands having an indented portion extending away from the parting line defining an opening between said passage and said scrap cavity when the mold is closed for passage of pressurized fluid therethrough;

(e) means for cooling the surfaces of said scrap and container shaped cavities; and (f) means for introducing said pressurized fluid into said closed mold through the open end of said passage to simultaneously expand portions of said expandable parison enclosed within said mold against the surface cooled walls of said communicating scrap and container shaped cavities.

5. The apparatus of claim 4 wherein the cross sectional area of the opening is between about ¼ to ¾ inch.

References Cited

UNITED STATES PATENTS

| | | | |
|---|---|---|---|
| 2,991,500 | 7/1961 | Hagen | 264—98 X |
| 3,120,679 | 2/1964 | Price et al. | 264—98 |
| 3,278,666 | 10/1966 | Donald | 264—98 |
| 3,342,916 | 9/1967 | Peters | 264—98 |
| 2,541,249 | 2/1951 | Hobson | 264—98 X |
| 3,207,822 | 9/1965 | Makowski | 264—97 |
| 3,281,514 | 10/1966 | Polka | 264—97 X |
| 3,359,602 | 12/1967 | Bailey | 264—94 X |

ROBERT F. WHITE, *Primary Examiner.*

T. J. CARVIS, *Assistant Examiner.*

U.S. Cl. X.R.

18—5; 264—161